US009517617B2

(12) United States Patent
Hoffman, Jr. et al.

(10) Patent No.: US 9,517,617 B2
(45) Date of Patent: Dec. 13, 2016

(54) PRINTING MACHINE SAFETY SYSTEM

(71) Applicant: M&R Printing Equipment, Inc., Glen Ellyn, IL (US)

(72) Inventors: Richard C. Hoffman, Jr., Lake Forest, IL (US); Boguslaw S. Biel, Carol Stream, IL (US); Bernabe Christopher Mauban, Hanover Park, IL (US); Brian William Quirk, Aurora, IL (US)

(73) Assignee: M&R Printing Equipment, Inc., Roselle, IL (US)

( * ) Notice: Subject to any disclaimer, the term of this patent is extended or adjusted under 35 U.S.C. 154(b) by 486 days.

(21) Appl. No.: 14/056,425

(22) Filed: Oct. 17, 2013

(65) Prior Publication Data

US 2014/0107826 A1 Apr. 17, 2014

Related U.S. Application Data

(60) Provisional application No. 61/715,072, filed on Oct. 17, 2012.

(51) Int. Cl.

| | |
|---|---|
| ***G06F 13/00*** | (2006.01) |
| ***B41F 33/00*** | (2006.01) |
| ***B41F 15/08*** | (2006.01) |
| ***B41F 15/12*** | (2006.01) |
| *B41F 19/02* | (2006.01) |
| *B41F 17/00* | (2006.01) |
| *B41F 17/08* | (2006.01) |
| *B41J 9/12* | (2006.01) |

(52) U.S. Cl.
CPC ....... *B41F 33/0018* (2013.01); *B41F 15/0863* (2013.01); *B41F 15/12* (2013.01)

(58) Field of Classification Search
CPC .... B41F 33/0018; B41F 15/0863; B41F 15/12
USPC ........ 700/117, 132, 159; 101/18, 22, 35–44, 101/84, 93.07
See application file for complete search history.

(56) References Cited

U.S. PATENT DOCUMENTS

| | | | | |
|---|---|---|---|---|
| 5,042,557 | A * | 8/1991 | Norsworthy | 160/351 |
| 5,226,362 | A * | 7/1993 | Iaccino et al. | 101/129 |
| 5,281,809 | A * | 1/1994 | Anderson et al. | 250/221 |
| 5,997,399 | A * | 12/1999 | Szatmary | 454/187 |
| 2011/0006897 | A1* | 1/2011 | Micko | 340/565 |

OTHER PUBLICATIONS

Leuze Electronic GmbH; Selected pages from 2011 Catalog for "Safety Sensors, Safety Systems, and Safety Services" regarding Safety Devices and Interface Safety at Work; pp. 71-246 and 265-352; copyright 2011.

* cited by examiner

*Primary Examiner* — Robert Fennema
*Assistant Examiner* — Thomas Stevens
(74) *Attorney, Agent, or Firm* — Nixon Peabody LLP

(57) ABSTRACT

A screen printing safety system is provided. The system includes a screen printing machine, and a plurality of zones in the vicinity of the screen printing machine. Each of the zones includes at least one sensor for sensing encroachment past a predetermined point. The sensors are adapted to stop operation of the screen printing machine when encroachment is sensed in at least one of the plurality of zones.

17 Claims, 12 Drawing Sheets

PRINTING MACHINE SAFETY SYSTEM

CROSS-REFERENCE TO RELATED APPLICATIONS

This application claims the benefit of U.S. Provisional Application No. 61/715,072, filed Oct. 17, 2012.

FEDERALLY SPONSORED RESEARCH OR DEVELOPMENT

N/A

TECHNICAL FIELD

The present invention generally relates to screen printing machines, and in particular to a safety system for use with such machines.

BACKGROUND OF THE INVENTION

Indicia applied permanently to articles of clothing and other textiles have become very popular. Fanciful indicia, such as logos, slogans, college names, sports team names and sayings, are now commonplace. As a result, screen printing has become very popular. Large, commercial operations screen printing textiles are common today.

Indicia can be one or more colors. Typically, a screen printing machine has at least one station for each color employed. For example, a design incorporating two colors will have at least two printing stations, one for each color. A design employing eight colors will have at least eight stations. Each station generally includes a printing head, which supports a single screen, the ink to be used at that particular station and a mechanism for applying the ink to the textile. Each color is carried by a single screen. The textile to be screened travels from printing station to printing station by one of a number of methods, such as a chain or a rigid arm. The textile is usually carried by a metal pallet, pallet support, flat bed, or platen. Common printing machines include turret, oval and linear type machines. In addition to printing stations, there may also be curing stations to heat and set the inks placed on the textile or substrate.

In the screen printing process, a stencil screen is typically blocked (called "masked" in the industry) to embody the desired indicia and is then placed over the item to be printed. Ink of one color is then added to the screen surface and flooded onto the indicia by a flood bar of conventional design. The ink may be of any type well-known in the industry for screen printing. After the ink is flooded onto the screen, the ink is squeegeed through the screen interstices onto the item, leaving ink of the desired color where the interstices in the screen are unblocked. The squeegee can be of any type known in the art.

After the item is printed on, it is moved to a station where one or more operators transfer the article to a drying rack, conveyor surface leading to a dryer, or the like. This requires quick and deft handling by the operator because the cycling of the printing machine may print a shirt every four to six seconds. Further, as the articles are typically adhered to the platen with an adhesive, the article must be lifted at an angle to break the adhesive seal without smudging the print on the article.

Unfortunately, operators, bystanders, and others are sometimes injured while working with or near the machine when it is in operation. This is sometimes caused by inattentiveness and/or failure to appreciate the possible dangers associated with printing machines when they are being operated. The present invention provides a system that stops all printing activities when a person is in an unauthorized zone, and in danger of potential harm.

SUMMARY OF THE INVENTION

A screen printing safety system is provided that is to be used for oval and turret style printing machines. The system includes a plurality of zones in the vicinity of the screen printing machine. Each of the zones includes at least one sensor for sensing encroachment past a predetermined point. The sensors are adapted to stop operation of the screen printing machine when encroachment is sensed in at least one of the plurality of zones.

BRIEF DESCRIPTION OF THE DRAWINGS

To understand the present invention, it will now be described by way of example, with reference to the accompanying drawings in which.

DETAILED DESCRIPTION

Figure 1:
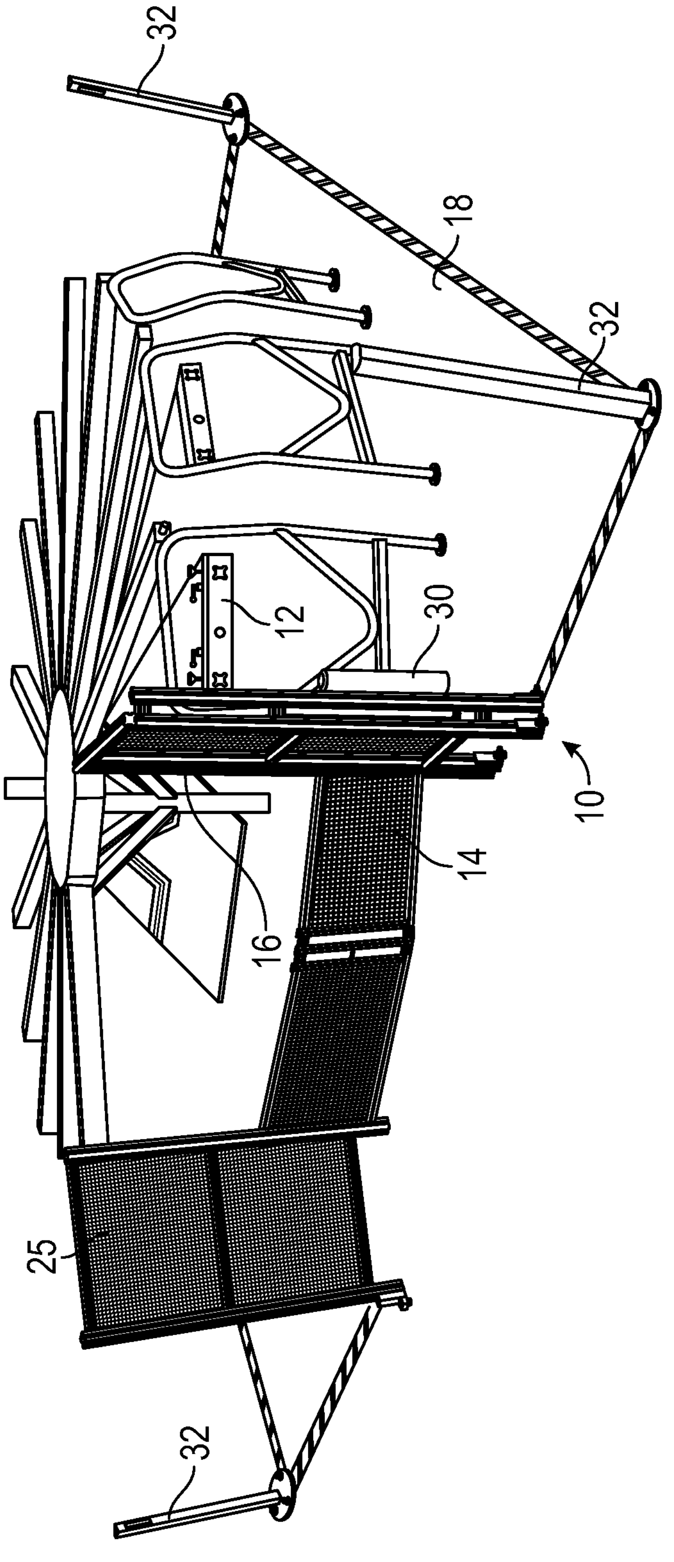
FIG. 1 is a perspective view of a screen printing safety system made in accordance with the teachings of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to the FIGS., a screen printing safety system 10 is shown. The system 10 includes a printing machine 12. The printing machine 12 can be any type of printing machine, including a turret, oval or linear type machine having multiple stations. The system 10 also includes three zones: a first zone 14, a second zone 16, and a third zone 18.

Figure 2:
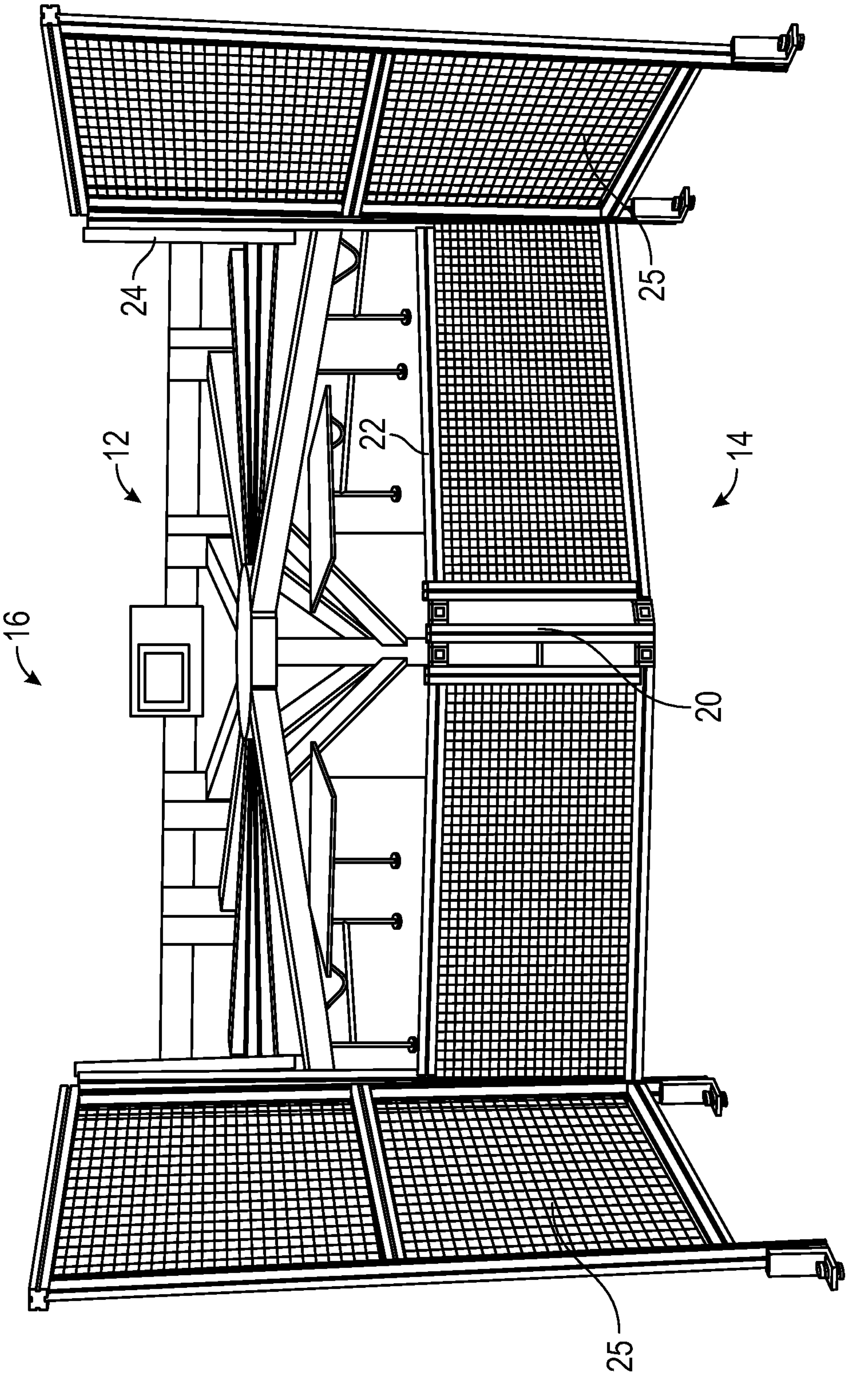
FIG. 2 is a perspective view of a first zone of the screen printing safety system of FIG. 1.

The first zone 14 is located in an area where one or more machine operators load and/or unload textiles or other printed materials onto or off of the textile supporting pallets. The first zone 14 includes a barrier 20 (FIG. 2). The barrier 20 is located at a distance and in a position in the vicinity of the machine 12 to ensure the safety of the operators as they load and/or unload the textiles. The barrier 20 preferably includes a gate 22. The gate 22 spans the operators' area and acts as a physical barrier to prevent an operator from approaching the machine 12 past a certain point or the line formed by the gate. The distance of the gate from the rotating pallets is such that it permits an operator to reach over the gate and comfortably put the textile on a stopped pallet or remove the textile from a stopped pallet. The gate 22 is preferably about waist-high to prohibit an operator from physically crossing the gate 22, but to also allow the operator to reach over the gate 22 to load and/or unload textiles from the machine 12.

Figure 3:
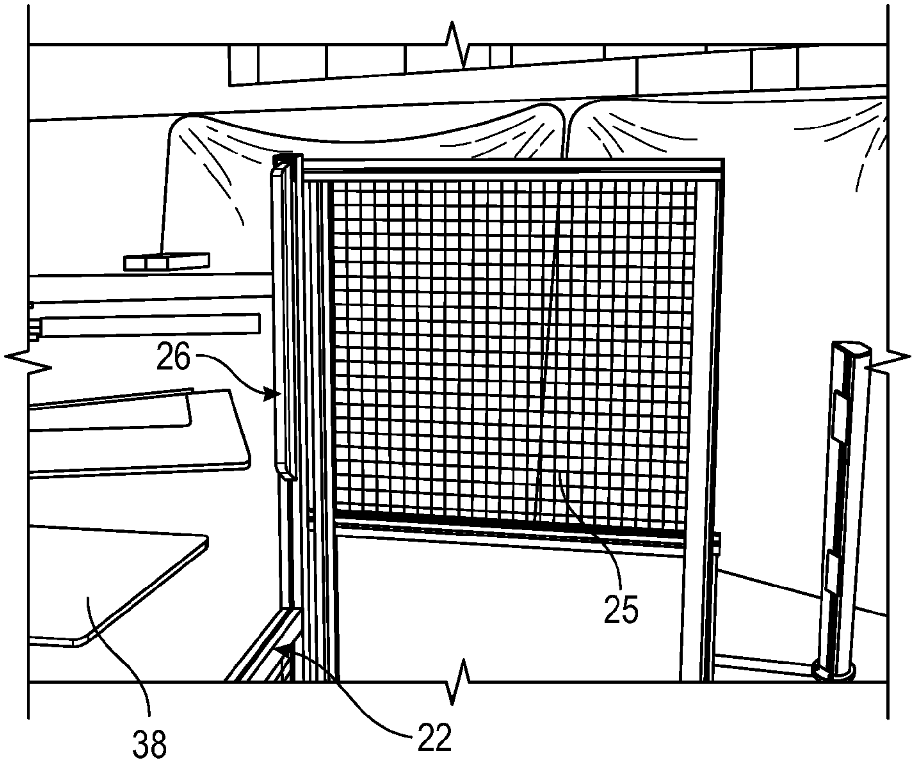
FIG. 3 is a perspective view of a second zone of the screen printing safety system of FIG. 1.
Figure 4:
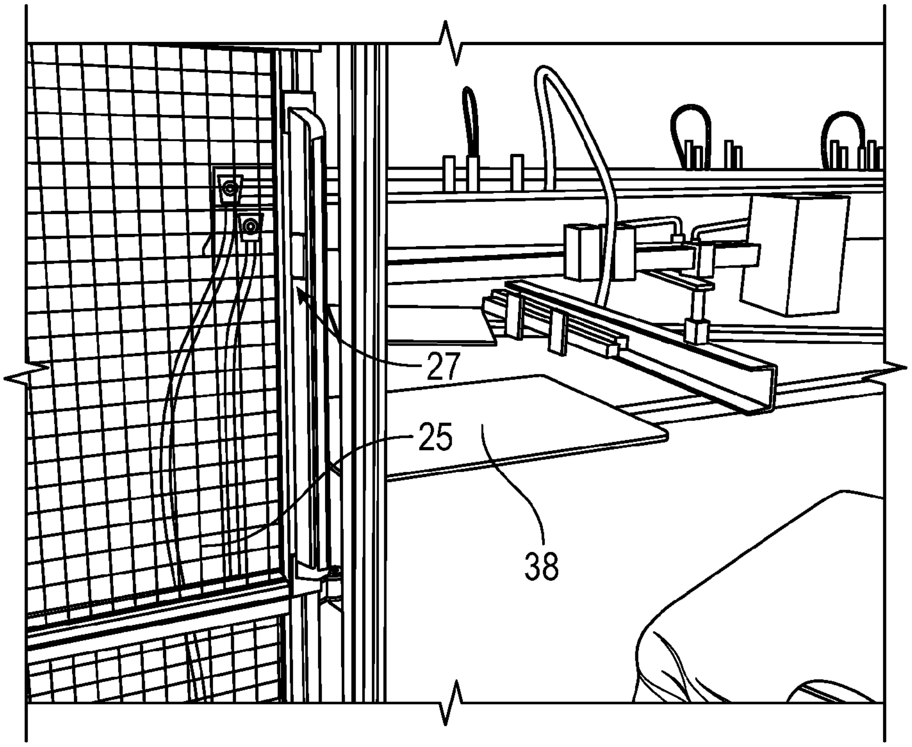
FIG. 4 is a further perspective view of the second zone of the screen printing safety system of FIG. 1.
Figure 5:
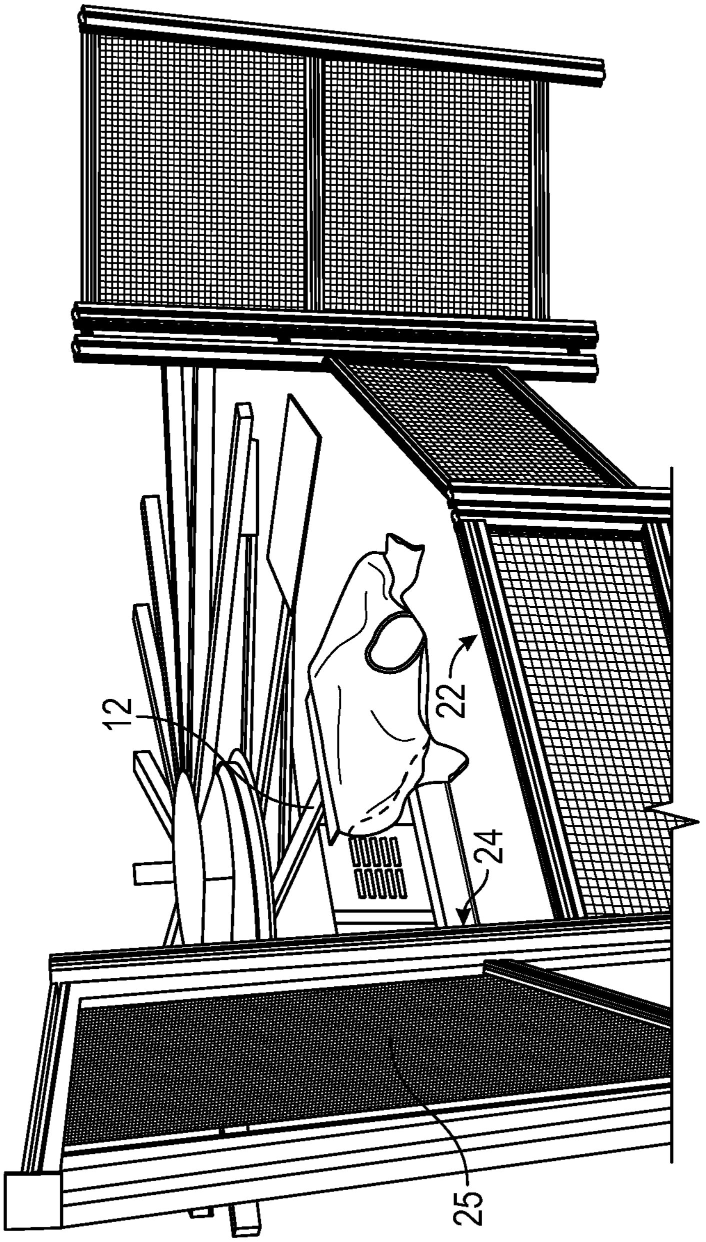
FIG. 5 is a still further perspective view of the second zone of the screen printing safety system of FIG. 1 in operation.

The second zone 16 includes a sensor incorporating a light curtain 24. The light curtain 24 spans the operators' position of the first zone 14, and begins at a height at about the top of the gate 22, approximately waist-high, and extends upward to a height of approximately six feet from ground level. The light curtain 24 preferably includes a light producing component or components 26 and a light reflecting component 27 or components (FIGS. 3 and 4). The light curtain 24 permits an operator to reach over the gate 22 when the arms or pallets of the printing machine 12 are stopped during a print cycle to load and/or unload textiles. However, should the operator cross, encroach, or break the area over or plane formed by the gate 22 while the machine 12 is in operation and the arms or pallets are moving, the light curtain 24 will sense the crossing, encroachment, or break and stop the machine 12 from rotating for the time when the light curtain 24 senses that the plane above the gate 22 has been crossed. When the light curtain 24 senses that the encroachment has stopped, it restarts the machine 12.

Figure 11:
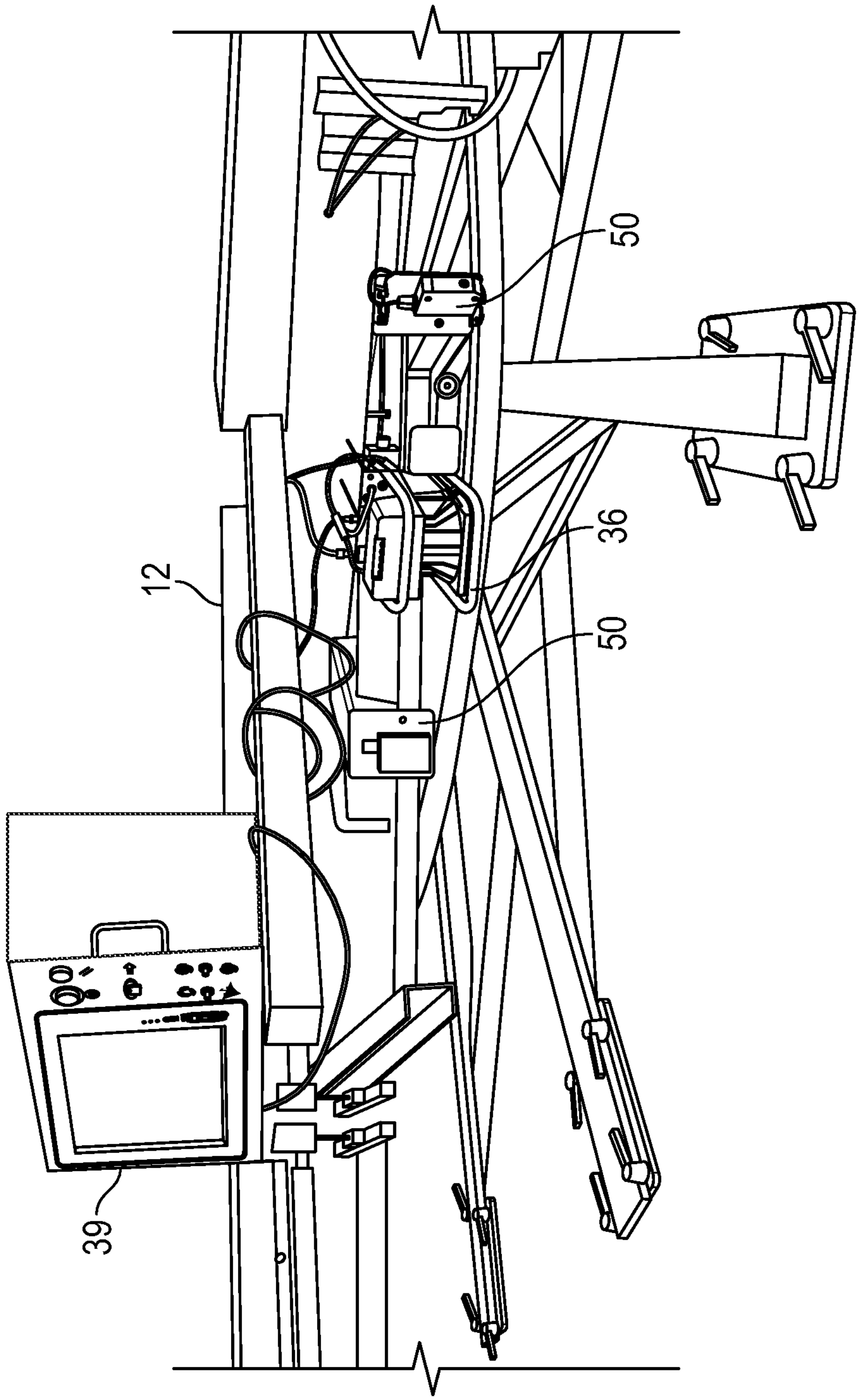
FIG. 11 is a perspective view of a scanner and display in accordance with the teachings of the present invention.
Figure 12:
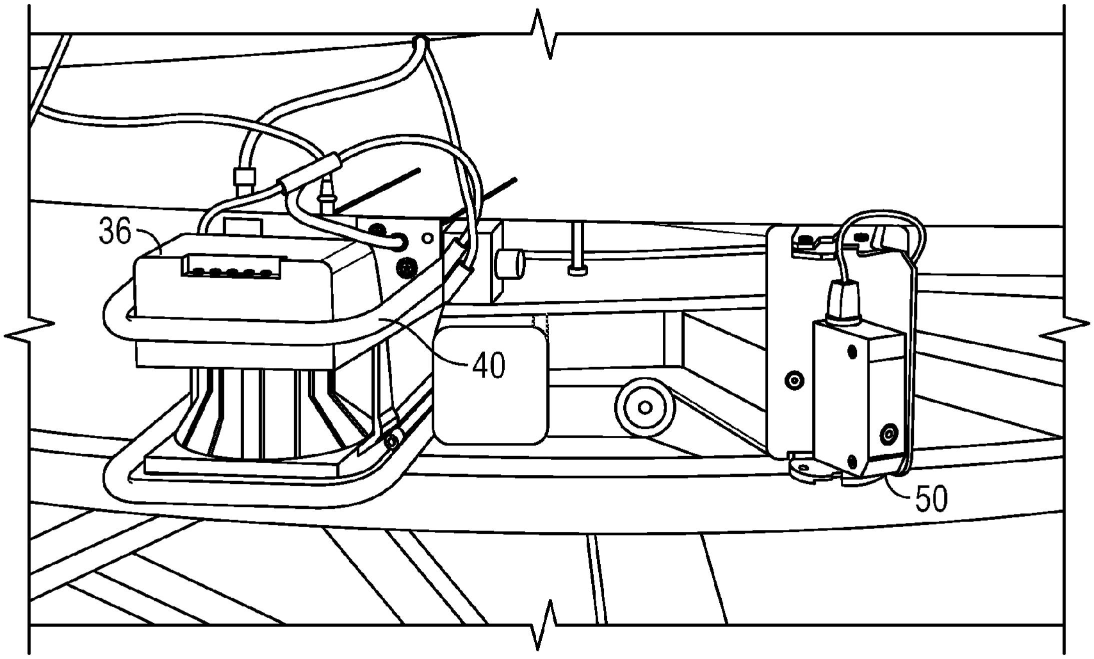
FIG. 12 is a perspective view of a scanner in accordance with the teachings of the present invention.
Figure 13:
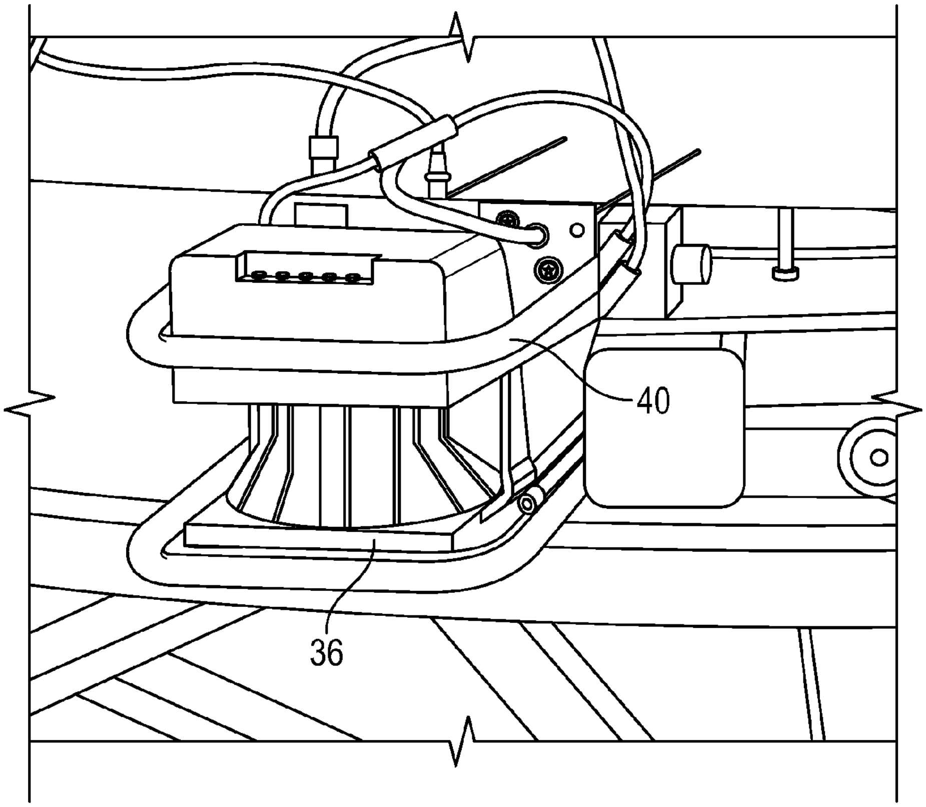
FIG. 13 is a perspective view of a scanner in accordance with the teachings of the present invention.

Adjacent each side of the gate 22 is a fence 25 that supports the light curtain 24. One fence 25 supports adjacent the gate 22 the light producing component or components 26 and the other fence 25 supports adjacent the gate 22 the light reflecting component 27, components or sensors. The fences 25 prevent one from physically reaching around or bypassing the gate 22 to unload or load a textile from the machine. Scanners 50 can also be used to define the boundaries of light curtain 24 (FIGS. 11 and 12).

Figure 6:
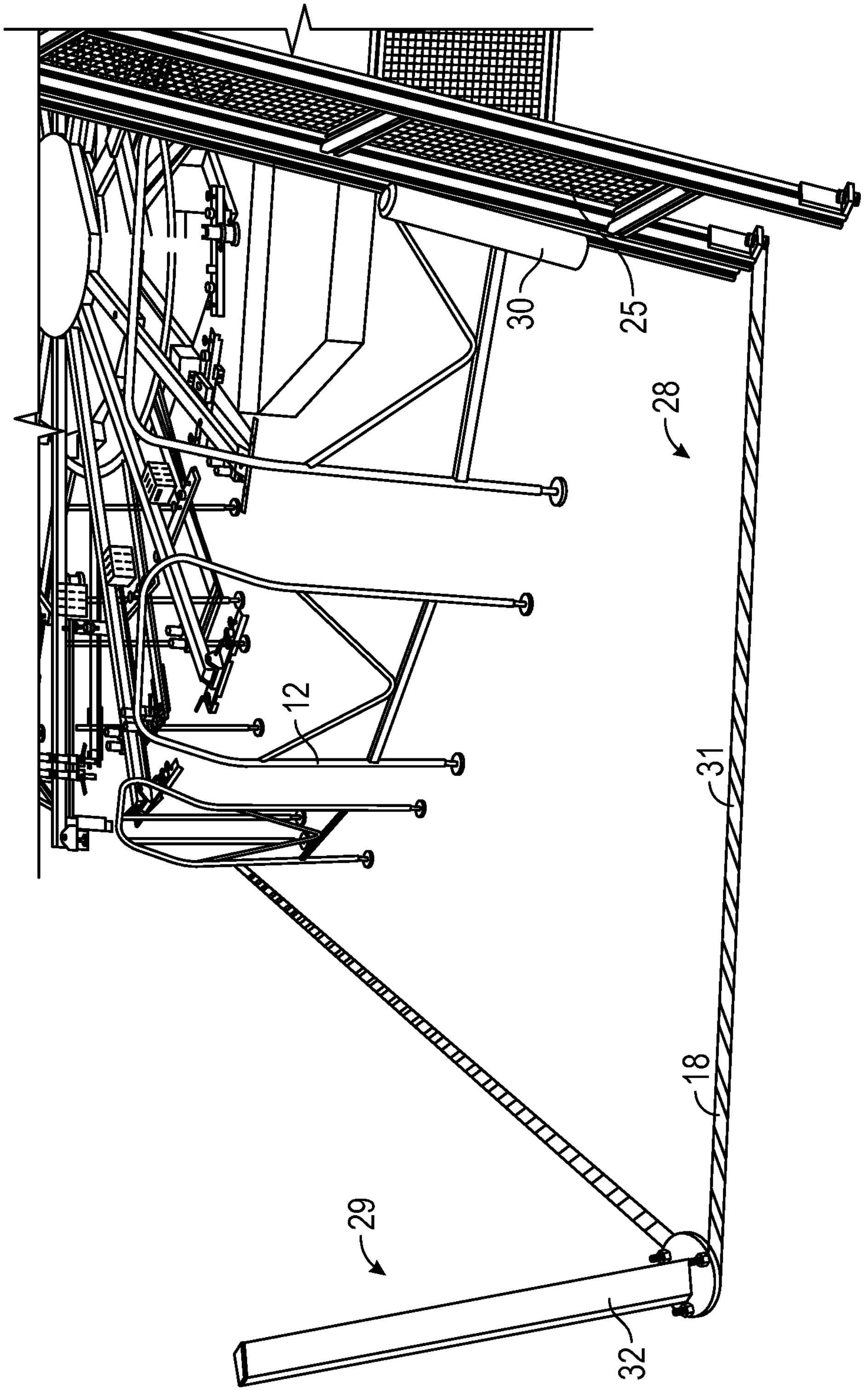
FIG. 6 is a perspective view of a third zone of the screen printing safety system of FIG. 1.
Figure 8:
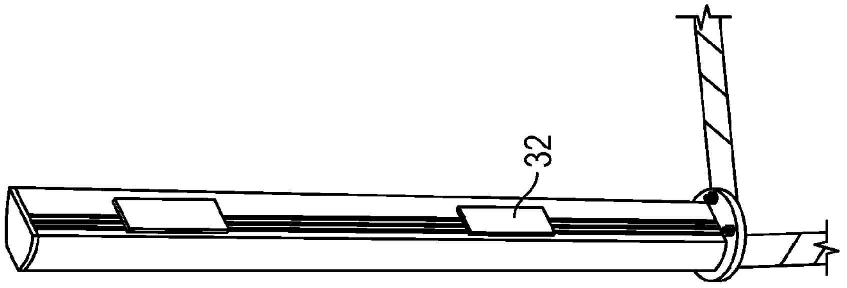
FIG. 8 is a still further perspective view of the third zone of the screen printing safety system of FIG. 1.
Figure 7:
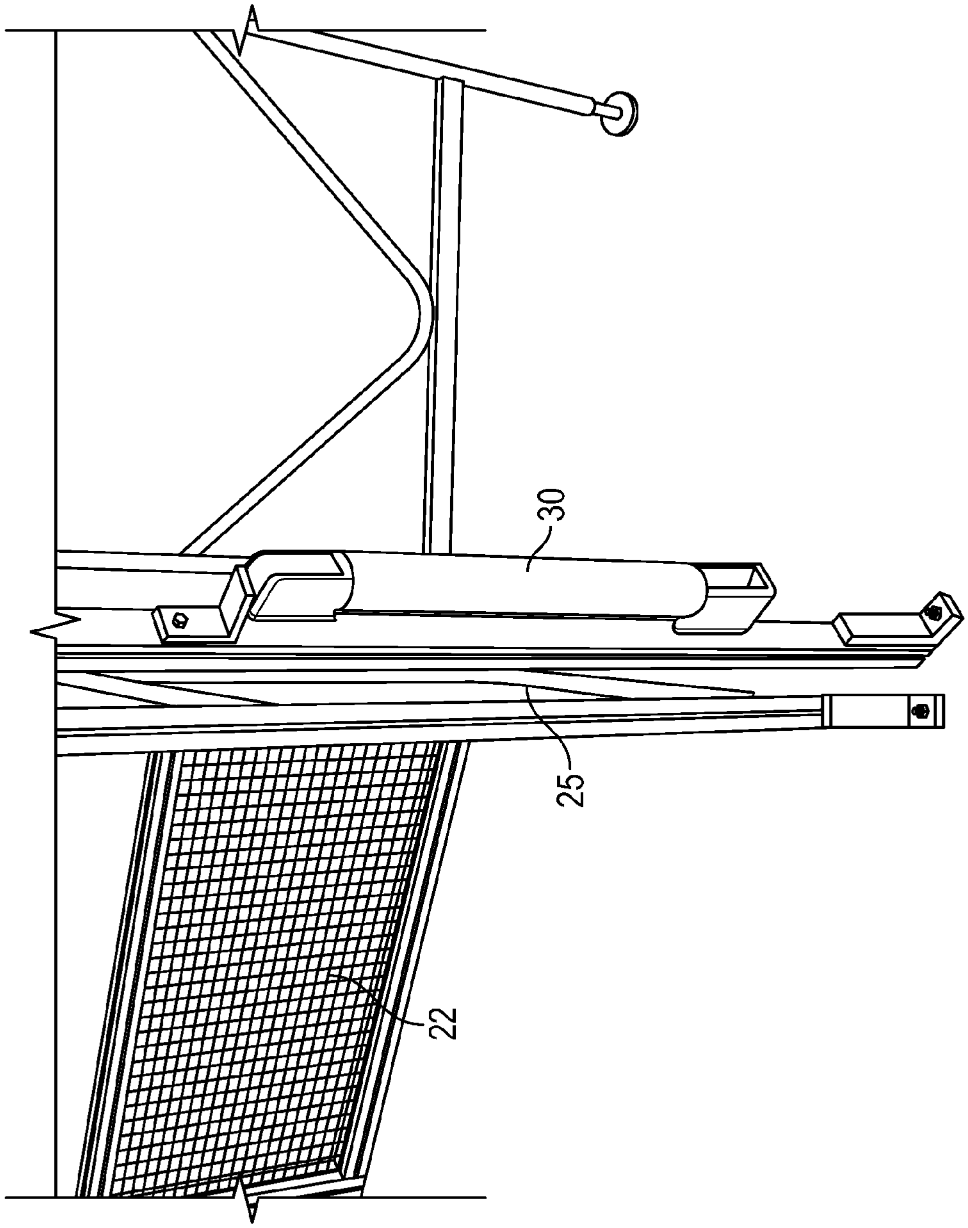
FIG. 7 is a further perspective view of the third zone of the screen printing safety system of FIG. 1.
Figure 9:
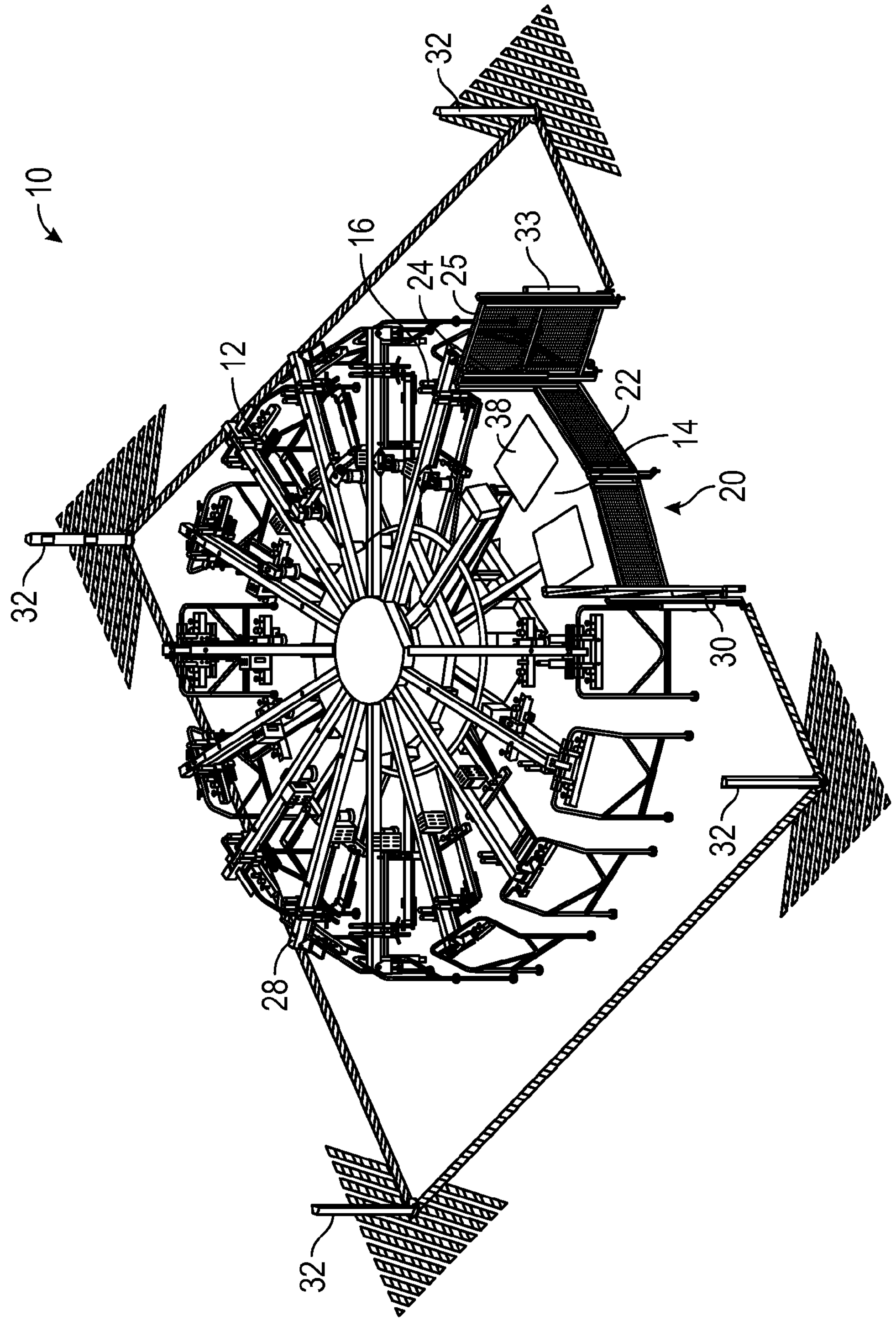
FIG. 9 is a perspective view of a screen printing safety system made in accordance with the teachings of the present invention.
Figure 10:
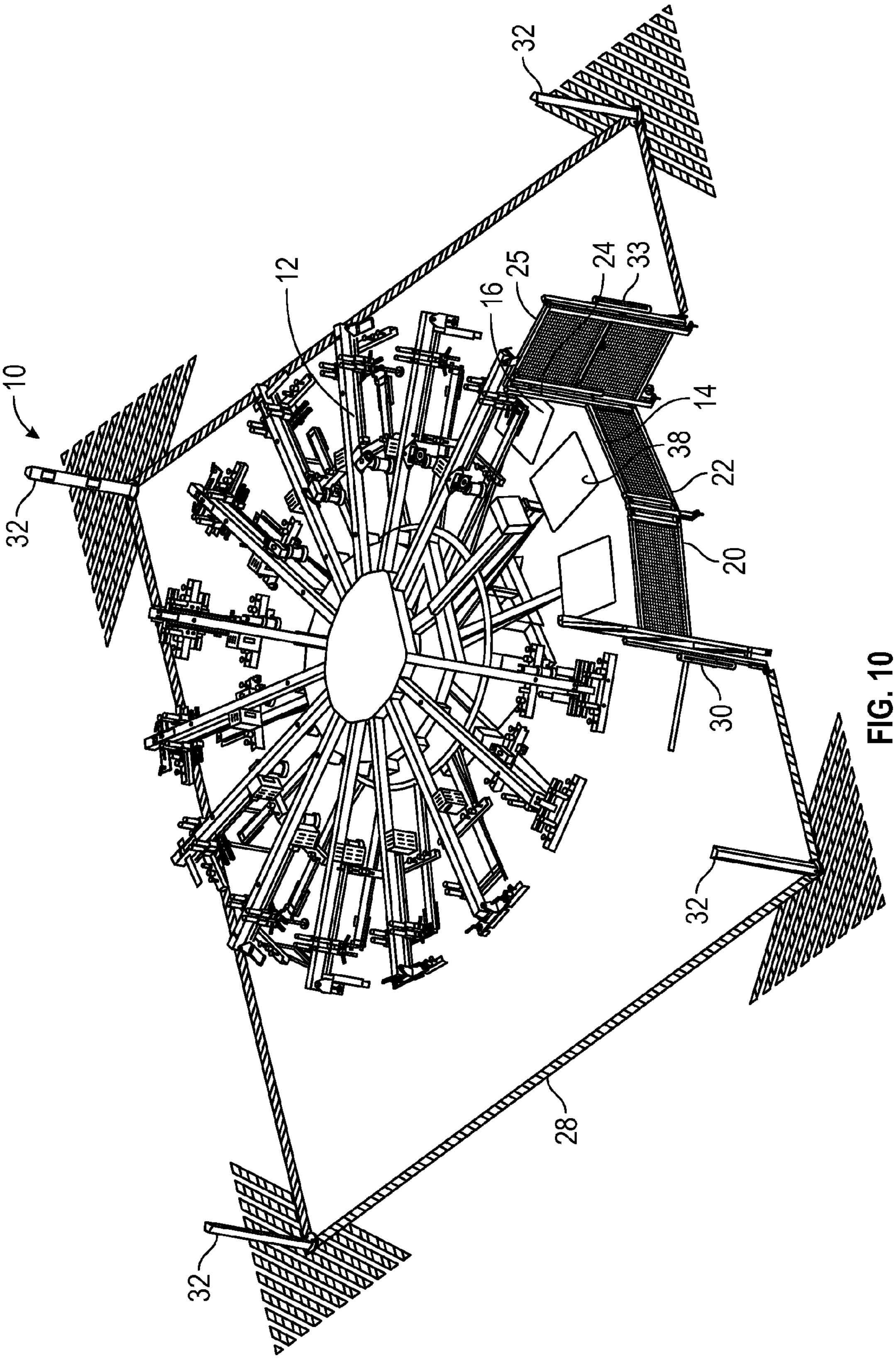
FIG. 10 is a perspective view of a screen printing safety system made in accordance with the teachings of the present invention.

The third zone 18 includes a perimeter guard 28 (FIG. 6). The perimeter guard 28 establishes a safe perimeter 31 around the machine 12. The perimeter guard 28 includes an encircling sensor or sensors having a light curtain 29 formed by a series of spaced apart light emitting components 30, light receiving components 33 and light reflecting components 32 located along the perimeter of the machine 12. The perimeter guard 28 is located at a distance from the machine 12 sufficient to ensure the safety of persons near the machine 12.

The embodiment shown uses four reflectors 32 to set up the third zone 18. In another embodiment, for smaller printing machines 12, the third zone 18 can be constructed using three points. The light emitting component 30 and light receiving component 33 can be located at one point, for example on or near the gate 22, and two reflectors 32 can be used with them to create the perimeter 28.

In another embodiment, a deflection mirror 60 can be used in conjunction with the light curtain 24 in the second zone 16. The deflection mirror 60 can be placed in the center of the gate 22 to deflect light emitted by the light producing component 26 to the light receiving component 27. The light curtain 24, therefore, follows the contour of the gate 22.

In operation, the system 10 functions as follows. If an operator moves or opens the gate 22 of the first zone 14, or if the operator crosses the light curtain 24 of the second zone 16, the light curtain 24 senses the movement or opening or crossing, and stops the machine 12. Additionally, if the perimeter guard 28 of the third zone 18 senses through the light curtain 29 that the perimeter guard 28 has been crossed, the machine 12 is stopped. The machine 12 restarts once the encroachment has ceased. The stopping of the machine 12 is accomplished by a signal from the light curtains 24 or 29 to a controller (not shown) that acts like an emergency OFF switch. Once the signal from the light curtain 24 or 29 is no longer blocked, the controller signals the machine 12 to restart from the point where it stopped.

In an embodiment of the present invention shown in FIGS. 10 through 15, an electronic laser scanner 36 is mounted to the printing machine 12. The scanner 36 is preferably of the type manufactured by Leuze Electronic GmbH+Co., Model Rotoscan RS4-2E. The scanner 36 scans a designated protective area. The scanner 36 can be programmed to create a protective area of any desired size or shape. Preferably, the scanner 36 is mounted such that it detects the presence of an object such as a hand or other body part in the operator area or first zone 14 of the printing machine. Additional scanners 36 can be situated to create the second and third zones 16 and 18.

The scanner 36 can be programmed to have both a warning field 41 and a protective field 43. For the warning field 41, the scanner 36 alerts a visual and/or audible warning when an object enters the area designated as the warning field 41. For the protective field 43, the printing machine 12 is instantly stopped should an object be detected entering or encroaching into the protective field 43. The controller of the printing machine 12 can be programmed to have a delay of a desired time to allow an operator to enter the warning field 41 and/or the protective field 43 for a desired amount of time before stopping the machine 12. This will, for instance, allow the operator to spray adhesive on platens 38, or place or remove a substrate from the platens 38. The controller of the printing machine 12 is programmed such that it starts up again after the object has been removed from the protective field 43.

Figure 14:
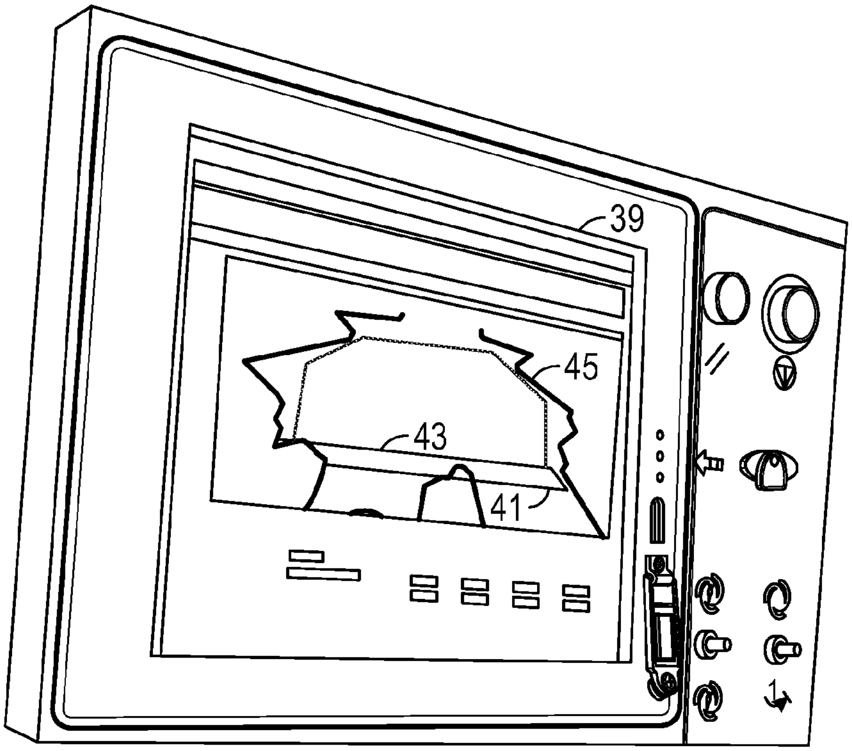
FIG. 14 is a perspective view of a display in accordance with the teachings of the present invention.
Figure 15:
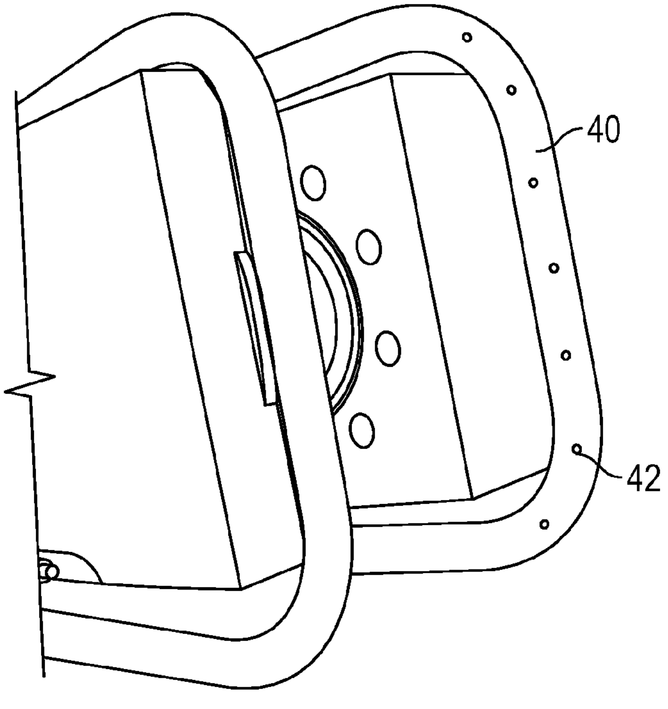
FIG. 15 is a perspective view of an air curtain in accordance with the teachings of the present invention.
Figure 16:
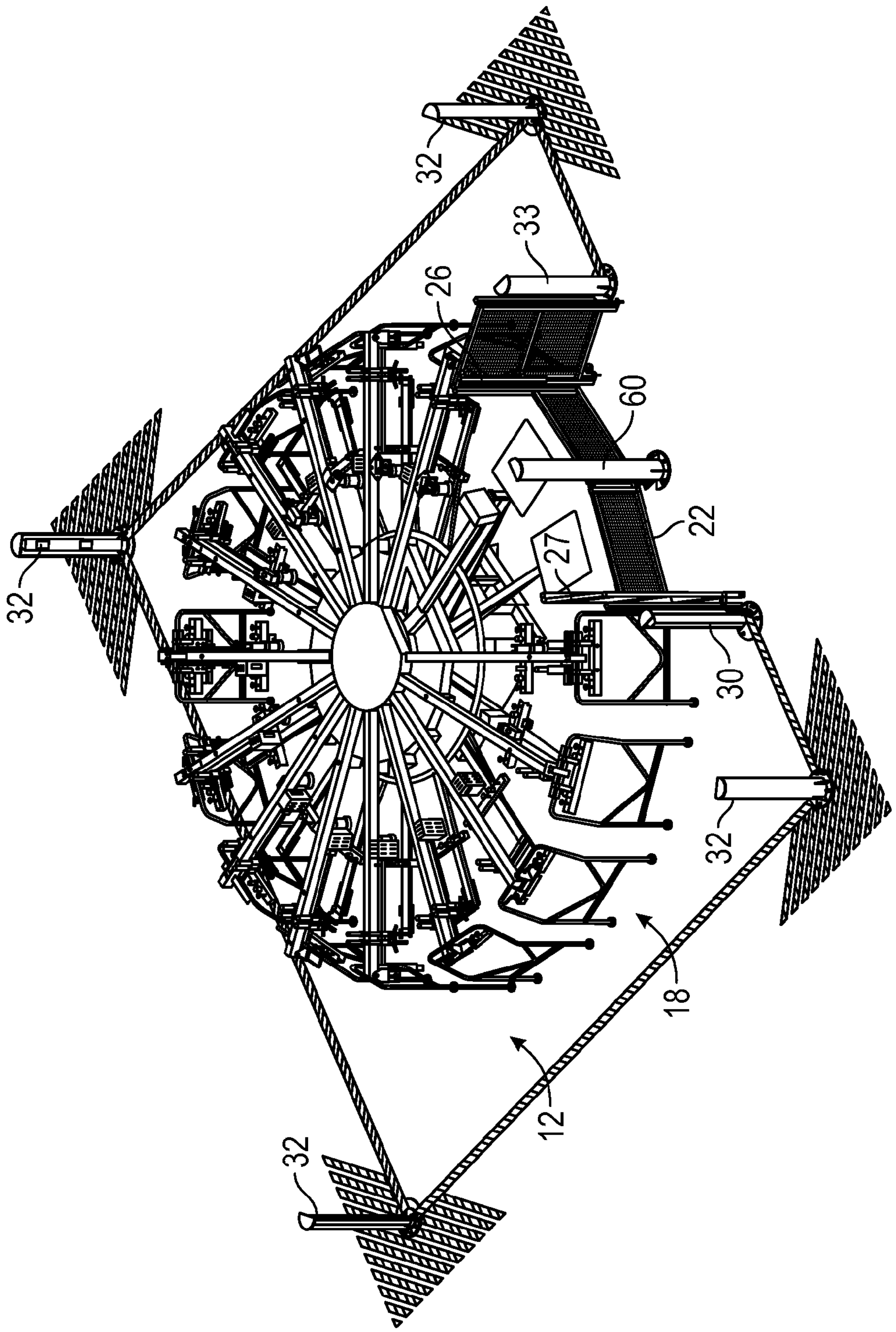
FIG. 16 is a perspective view of a screen printing safety system made in accordance with the teachings of the present invention.

The scanner 36 can be associated with a display 39. As shown in FIG. 14, the display 39 can show the outlines of the warning field 41 and the protective field 43. The outline 45 also shows objects within the range of the scanner 36 and their proximity to the fields 41 and 43.

It was found that when an operator sprayed glue onto the platens 38 of the printing machine 12 to adhere a substrate thereto, errant adhesive spray would interfere with operation of the scanner 36. An air curtain bar 40 mounted in front of the scanner 36 directs a curtain of air downward from the scanner 36. The air curtain bar 40 is hollow and includes a plurality of air openings 42 in the bottom thereof. The air curtain bar 40 deflects errant spray and other airborne particles away from the scanner 36.

While the specific embodiments have been illustrated and described, numerous modifications come to mind without significantly departing from the spirit of the invention, and the scope of protection is only limited by the scope of the accompanying Claims.

What is claimed is:

1. A screen printing safety system having two areas of protection from encroachment comprising:

a screen printing machine having a loading area and a printing area, and a plurality of textile supporting pallets mounted for movement a first height above a supporting surface between the loading area where an operator can place textiles on or remove textiles from one of the plurality of textile supporting pallets, and the printing area having a plurality of print stations;

a first entryway to the loading area from outside the loading area having a first vertical dimension from a floor to a top being sufficient to accommodate a human operator;

a segmented barrier to the first entryway enclosing a first area of protection, the segmented barrier comprising:

a gate moveable from an open position to provide access to a first zone to a closed position to form a physical barrier to entry into the first zone, the gate adapted to stop operation of the machine upon movement of the gate; and a first light curtain sensor for detecting encroachment into a second zone, the first zone and the second zone being disposed in a common vertical plane spanning a portion of the first entryway, the first zone extending approximately to the first height and the second zone extending from a point upward therefrom to the top;

a second entryway to the printing area;

a second light curtain sensor surrounding the second entryway to define a second area of protection; and the first light curtain sensor and the second light curtain sensor being adapted to stop operation of the screen printing machine when encroachment is sensed.

2. The screen printing safety system of claim 1 wherein the physical barrier includes a gate.

3. The screen printing safety system of claim 2 wherein the gate is approximately waist-high of the human operator.

4. The screen printing safety system of claim 1 wherein the first light curtain includes a light emitting component and a light reflecting component.

5. The screen printing safety system of claim 4 wherein the second light curtain includes a light emitting component and a light reflecting component.

6. The screen printing safety system of claim 1 wherein the second light curtain includes a plurality of light emitting components and light reflecting components.

7. The screen printing safety system of claim 1 further comprising a video comparison system.

8. The screen printing safety system of claim 1 further comprising a photoelectric eye.

9. The screen printing safety system of claim 1 further comprising a scanner to scan a designated area for encroachment into a designated area.

10. The screen printing safety system of claim 9 wherein the designated area is the first area of protection.

11. The screen printing safety system of claim 9 further including an air curtain, the air curtain directing airborne particles away from the scanner.

12. The screen printing safety system of claim 9 wherein the designated area includes a warning field and a protective field.

13. The screen printing safety system of claim 9 wherein there is a time delay between sensing encroachment into the designated area and stopping operation of the printing machine.

14. The screen printing safety system of claim 1 wherein the operation of the screen printing machine restarts once the encroachment is no longer sensed.

15. A screen printing safety system having two areas of protection from encroachment comprising:

a screen printing machine having a loading area and a printing area, and a plurality of textile supporting pallets mounted for movement a first height above a supporting surface between the loading area where an operator can place textiles on or remove textiles from one of the plurality of textile supporting pallets, and the printing area having a plurality of print stations;

a first entryway to a loading area from outside the loading area having a first vertical dimension from the floor to a top being sufficient to accommodate a human operator;

a segmented barrier to the first entryway enclosing a first area of protection, the segmented barrier comprising:

a gate moveable from an open position to provide access to a first zone to a closed position to form a physical barrier to entry into the first zone, the gate adapted to stop operation of the machine upon movement of the gate; and a first light curtain sensor for detecting encroachment into a second zone, the first zone and the second zone being disposed in a common vertical plane spanning a portion of the first entryway, the first zone extending approximately to the first height and the second zone extending from a point upward therefrom to a top;

a first fence at one end of the gate to form a barrier to entry to the first area of protection;

a second entryway to the printing area;

a second light curtain sensor surrounding the second entryway to define a second area of protection; and the first light curtain sensor and the second light curtain sensor being adapted to stop operation of the screen printing machine when encroachment is sensed.

16. The screen printing safety system of claim 15 further comprising a second fence at an opposed end of the gate to form a barrier to entry into the first area of protection.

17. The screen printing system of claim 16 wherein the first fence supports a light producing component of the first light curtain and the second fence supports a light receiving component of the first light curtain.

* * * * *